United States Patent
Golson et al.

Patent Number: 5,761,505
Date of Patent: Jun. 2, 1998

[54] SYSTEM AND METHOD FOR AUTOMATICALLY AND RELIABLY MANAGING GLOBAL RESOURCES IN A COMPUTER NETWORK

[75] Inventors: William G. Golson; James A. Darling; Munir Mallal, all of Fort Collins, Colo.

[73] Assignee: Hewlett-Packard Co., Palo Alto, Calif.

[21] Appl. No.: 559,977

[22] Filed: Nov. 17, 1995

[51] Int. Cl.⁶ .......................................................... G06F 9/06

[52] U.S. Cl. ...................... 395/653; 395/200.55

[58] Field of Search ................... 395/651, 652, 395/653, 712, 200.55, 200.51, 200.72

[56] References Cited

U.S. PATENT DOCUMENTS

| | | | |
|---|---|---|---|
| 5,619,716 | 4/1997 | Nonaka et al. | 395/200.55 |
| 5,649,100 | 7/1997 | Ertel et al. | 395/200.55 |

*Primary Examiner*—Kevin A. Kriess

[57] ABSTRACT

A global resource management system has a plurality of computer systems interconnected via a network and a global resource data base stored in a global memory connected to the network. Each of the computer systems has a processor, a local memory, an input device configured to receive a configuration task to be performed on the computer systems in the network, a local interface for interconnecting the processor, the local memory, and the input device, and a global resource management system stored in the local memory and driven by the processor. The global resource management system of each computer system includes both a task manager and a reconciliator. The task manager forwards the configuration task to other computer systems for execution thereon. Moreover, the task manager stores the identities of any nonresponsive computer systems along with a configuration action that corresponds to the unperformed task in the global resource data base in the global memory. The reconciliator communicates with the global resource data base in the global memory when its corresponding computer system is activated to retrieve any unperformed configuration actions that were directed to resources under the computer system's control and performs any such unperformed configuration actions upon those resources.

20 Claims, 7 Drawing Sheets

SYSTEM AND METHOD FOR AUTOMATICALLY AND RELIABLY MANAGING GLOBAL RESOURCES IN A COMPUTER NETWORK

FIELD OF THE INVENTION

The present invention generally relates to computer networks, and more particularly, to a system and method for automatically and reliably managing global resources in a computer network and configuring computer systems of the network relative to the global resources.

BACKGROUND OF THE INVENTION

A "computer network" is generally a collection of hardware and software that connects computer systems and allows them to share global resources. A computer network includes physical connections, such as ethernet cables, between various hardware components, and software used to enable communications among various computer systems, peripherals, and other resources. The software is based on protocols, or rules, that define its operation. Furthermore, networks are categorized as point-to-point networks, local area networks (LANs), or wide area networks (WANs), depending on where the computer is located. Point-to-point networks connect to hosts. LANs and WANs are multi-point topologies that can both accommodate two or more participating hosts.

Within the realm of LANs, WANs and point-to-point networks are the actual particular physical connection topologies. This is how each component of the network is actually laid out and connected to other components. These topologies are often mixed to form a WAN. The most common topologies include ring, star, bus, tree, and mesh network topologies, which are all well known in the art.

In the context of this document, a "resource" is essentially a configurable element, such as a printer, file system, etc.. A "global resource" is a resource, such as a printer, a file system, etc., that is to be managed globally and shared across a domain of the network. A "domain" is a group, or set, of computer systems in the network that share the global resource, and the number of domain computer systems is less than or equal to the total number of network computer systems. Moreover, a "local resource" is a resource that is used primarily by a computer system to which it is connected.

The computer systems that share global resources must be configured to know enough details about the global resources in order to permit use thereof. Furthermore, when a global resource of a network is changed (e.g., added, modified, or deleted), the computer systems that share the global resource must be advised of the change so that the systems know what is currently available for use on the network.

In order to properly configure the computer systems in many conventional network schemes, each computer system is typically individually accessed and programmed via its respective input device, such as a keyboard or mouse. A software engineer is oftentimes needed to do the programming, especially when new resource types are added to the network, as this configuration change is a more complex configuration task than others. The programming causes the computer system to execute a "configuration task," which is generally one or more instructions that modify the configuration data of the resource so that the data is current and accurate.

Moreover, in those network schemes that do attempt to provide automatic configuration, the automatic configuration methodology is inadequate and problematic. When a computer system is turned off, or deactivated, during the time when a new resource, such as a printer, nonvolatile disk storage system, etc., is changed in the network, the deactivated computer system does not execute the configuration task corresponding with the resource change and will not know the correct new configuration of resources on the network when it is eventually activated, until it is ultimately manually programmed.

Thus, a heretofore unaddressed need exists in the industry for a system and method for automatically and reliably managing global resources of a network and for configuring computer systems of a network relative to global resources.

SUMMARY OF THE INVENTION

Briefly described, the present invention provides for a system and method for automatically and reliably managing global resources of a network and configuring computer systems of the network relative to the global resources. A global resource is a resource, for example but not limited to, a printer, a file system, etc., that is to be managed globally and shared across a domain of the network.

In architecture, the system comprises a plurality of computer systems interconnected via a network. A global memory, for example but not limited to, a nonvolatile disk storage device, tape system, etc., is connected to the network, and a global resource data base is situated within the global memory. Each of the computer systems comprises a processor, a local memory, an input device configured to receive a configuration task to be performed on computer systems in the network, a local interface for interconnecting the processor, the local memory, the input device, and a global resource management system, which is essentially software that is stored within the local memory and which implements the novel features of the present invention.

More specifically, the global resource management system is implemented as one or more application modules, which reside hierarchically and logically over the operating system associated with each computer system. The global resource management system includes a task manager and a reconciliator, which both work together in each computer system to ensure that the global resource configuration of the network, as viewed by the respective computer system, is maintained up-to-date, automatically and reliably. The task manager is adapted to receive and execute a configuration task. The task results from and utilizes configuration information received locally via the input device. Further, the task manager forwards the configuration task to the other computer systems for execution thereon. The task manager is configured to store the identity of any nonresponsive computer system along with a configuration action, which corresponds to the unperformed configuration task, in the global resource data base in the global memory.

The reconciliator in each computer system is configured to communicate with the global resource data base in the global memory when the computer system is activated to retrieve any configuration action that is directed to any resource under the control of the computer system. The configuration action corresponds to the unperformed task directed to the resource. Furthermore, the reconciliator performs any configuration tasks in accordance with the configuration action on its corresponding computer system.

The present invention can also be construed as providing a method for configuring a plurality of interconnected computer systems that have access to a nonvolatile global memory. Broadly summarized, the method comprises the steps of: communicating a configuration task to a particular computer system; executing the configuration task on the particular computer system; forwarding the configuration task from the particular computer system to at least one other computer system for execution thereon; storing an identity of a nonresponsive computer system along with a configuration action that corresponds with the configuration task in the global memory; and when the nonresponsive computer system becomes responsive, executing a configuration task that corresponds to the configuration action on the nonresponsive computer system.

The global resource management system and method of the present invention have numerous advantages, a few of which are delineated hereafter, as merely examples.

An advantage of the system and method is that the global resource configuration associated with a domain of a network is automatically and completely updated in each computer system of the domain.

Another advantage of the system and method is that the global resource configuration associated with a domain of a network is updated in a reliable and efficient manner in each computer system of the domain.

Another advantage of the system and method is that inconsistencies are eliminated arising between global intention and local reality when a computer system is unavailable to the domain of computer systems in a network.

Another advantage of the system and method is that they are simple in design, easily implemented in software (best mode), hardware, or a combination thereof, and do not require excessive logic or code for implementation.

Other features and advantages of the present invention will become apparent to one with skill in the art upon examination of the following drawings and detailed description. It is intended that any such additional features and advantages be included herein within the scope of the present invention, as is defined in the accompanying claims.

BRIEF DESCRIPTION OF THE DRAWINGS

The global resource management system and method of the present invention can be better understood with reference to the following drawings. The size of the software and hardware elements in the schematic drawings are not necessarily to scale in terms of physical size, emphasis instead being placed upon clearly illustrating principles of the present invention. Moreover, like reference numerals designate corresponding parts throughout the several views.

DETAILED DESCRIPTION OF THE PREFERRED EMBODIMENT

The global resource management system and method of the present invention can be stored on any computer readable medium for use by or in connection with any computer related system or method. In the context of this document, a computer readable medium is an electronic, magnetic, optical, or other physical device or means that can contain or store a computer program for use by or in connection with a computer related system or method. In the preferred embodiment, the global resource management system 30 (FIG. 2) is stored along with the operating system in each computer system associated with a network and is implemented as one or more software modules in application programs residing, in a hierarchical and logical sense, over the operating system.

Figure 1:
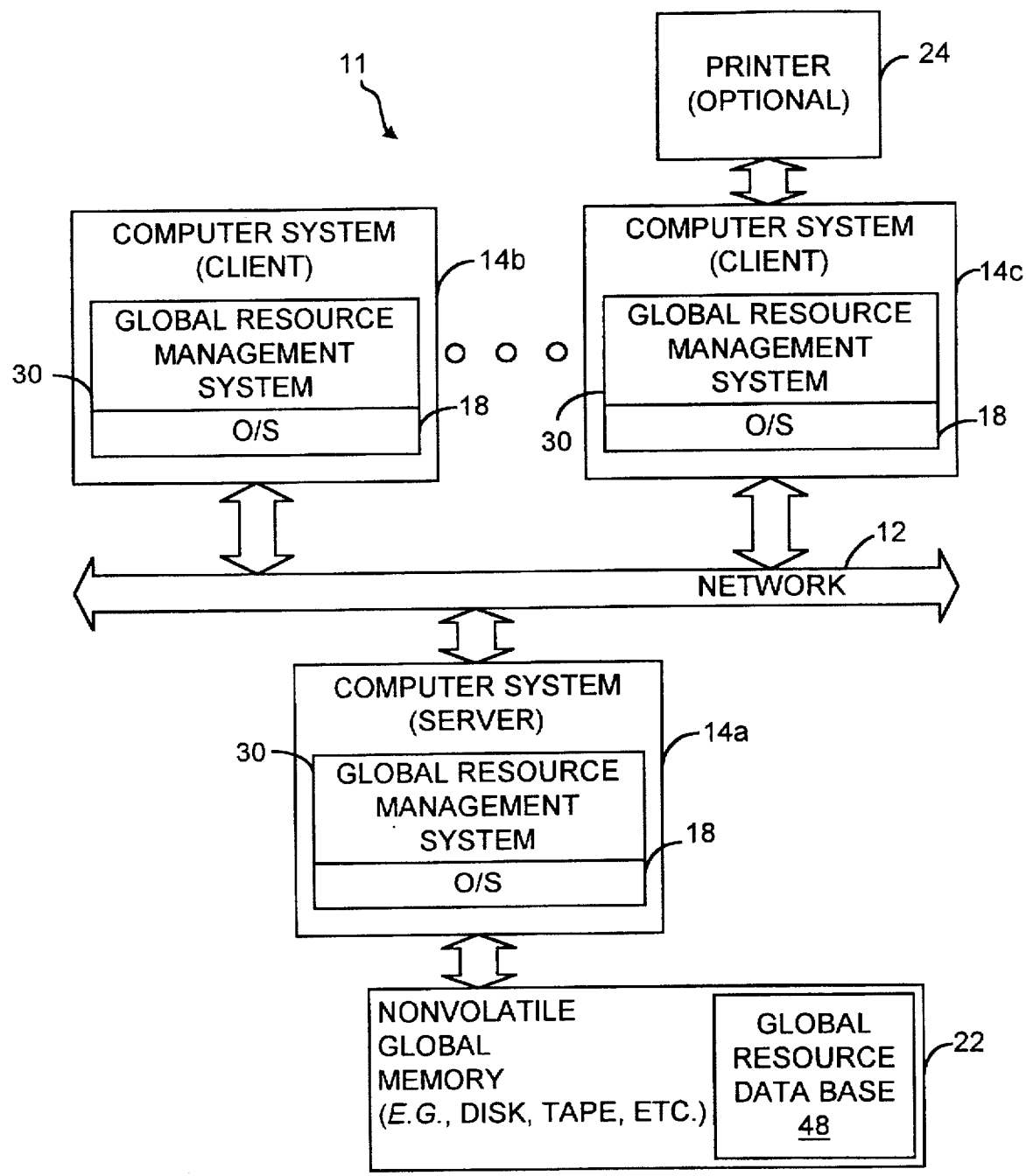
FIG. 1 is a block diagram illustrating an example of a network within which the novel global resource management system and method of the present invention may be implemented.

FIG. 1 illustrates a network system 11 having a network 12 that interconnects a plurality of computer systems 14a–14c. In the preferred embodiment, the computer systems 14a–14c are HP 9000 (Series 700 or 800 for the client(s) and Series 800 for the server) computer workstations, which are manufactured by and commercially available from the Hewlett-Packard Company, U.S.A. For purposes of discussion and illustration, the network 12 of FIG. 1 is shown as a bus type network; however, it should be realized that the network topology could take various other forms, including but not limited to, ring, star, tree, and mesh type configurations. Furthermore, the network 11 could be a point-to-point network, a LAN, or a WAN. Each of the computer systems 14a–14c comprises a complete operating system or a kernel 18, which operates the hardware associated with each of the computer systems 14a–14c and which cooperates with application programs to drive the associated hardware. In the preferred embodiment, the operating system 18 is model "HP-UX"™, which is a "UNIX"™ based (multitasking) operating system that is commercially available from the Hewlett-Packard Company, USA.

Generally, one of the computer systems, that denoted by reference numeral 14a in the example of FIG. 1, is the "server," while the remainder of the computer systems, i.e., those denoted by reference numerals 14b, 14c, are the "clients" of the network system 11. The server computer system 14a maintains a nonvolatile global memory 22, for example, but not limited to, an optical or magnetic disk drive storage system, a magnetic tape storage system, etc., which can be shared by and accessed by one or more of the computer systems 14a–14c of the network system 11. In essence, the global memory 22 is a global resource because it is shared globally across a prescribed network domain. In general, the "domain" as used herein is a group, or set, of the computer systems 14a–14c in the network system 11 that share the global resource, and the number of domain computer systems (one or more of 14a–14c) is less than or equal to the total number of network computer systems 14a–14c.

Furthermore, a printer 24, as an example, may be connected to one or more of the computer systems 14a–14c in the network system 11. For purposes of discussion and illustration, the printer 24 is shown in FIG. 1 connected to a client computer system 14c. The printer 24 may be dedicated as a global resource to the domain, if the printer 24 is configured in this manner. Moreover, it should be noted that one or more other nonvolatile global memories (not shown) may be connected to client computer system 14b, 14c and may be dedicated to serve as global resources for the prescribed domain within the network system 11.

Figure 2:
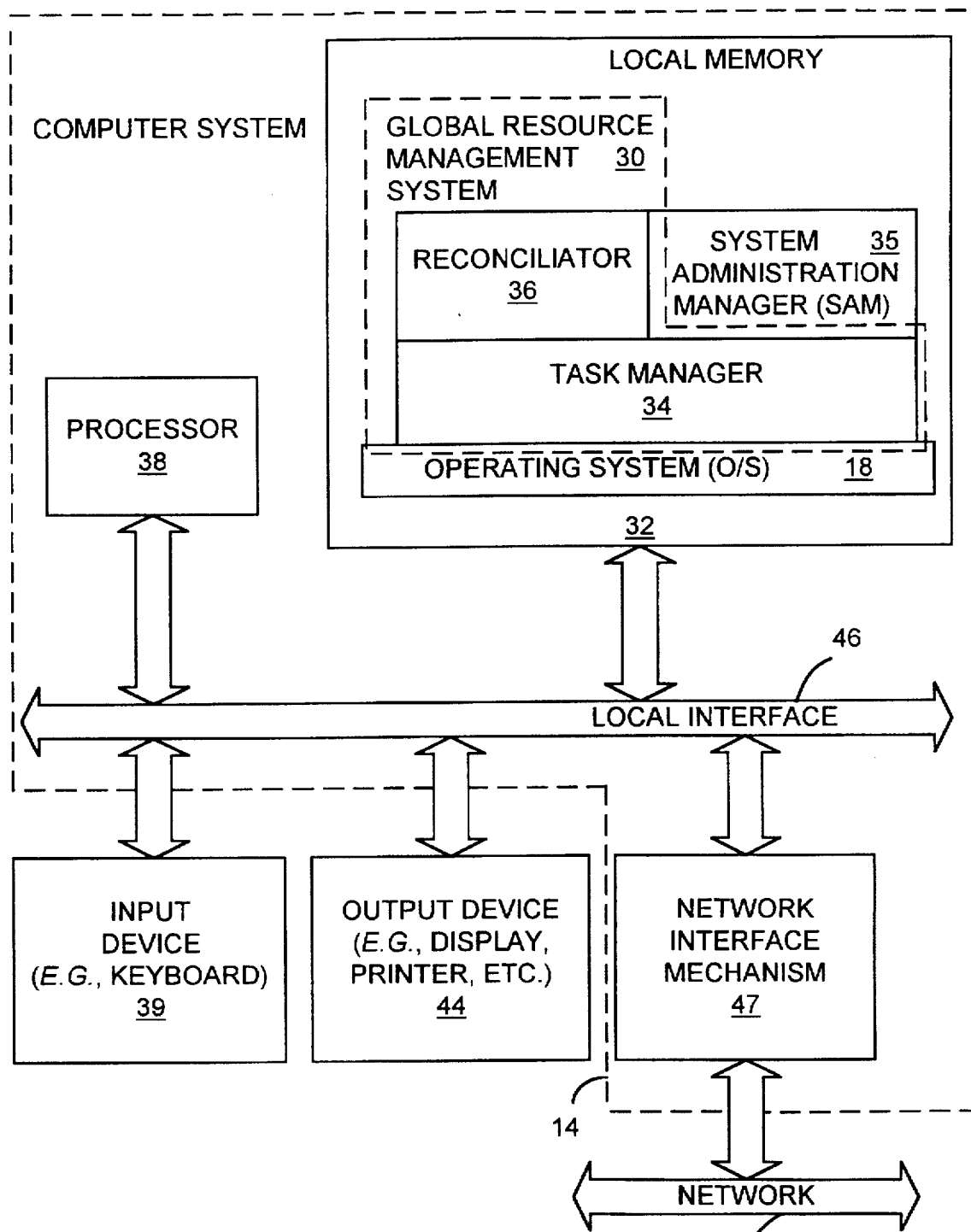
FIG. 2 is a block diagram of a computer system connected to the network of FIG. 1 and including the novel global resource management system, which has a reconciliator and a task manager.

In the preferred embodiment of the present invention, as illustrated in FIGS. 1 and 2, the global resource management system 30 resides hierarchically and logically over the operating system 18 that is stored within a local memory 32 associated with the computer system 14. The global resource management system 30 has a task manager 34 and a reconciliator 36, which are essentially both application software modules situated over the operating system 18. It should be understood that other configurations for implementing the global resource management system 30 are possible, including for example, implementing the global resource management system 30 as part of the operating system 18.

Moreover, in the preferred embodiment, a system administration manager (SAM) 35 is implemented hierarchically and logically over the task manager 34. The SAM 35 is an application tool for creating, invoking, and performing system management tasks and applications on its corresponding computer system 14a-14c. In this embodiment of the invention, the SAM 35 interacts with the user to receive global configuration changes, verifies configuration task inputs, and forwards the configuration task inputs to the task manager 34 for execution.

The local memory 32 of each computer system 14a-14c, as shown in FIG. 2, is typically a random access memory (RAM) that receives the operating system (or kernel) 18 from a nonvolatile memory storage device (e.g., a battery powered CMOS memory; not shown), which is typically situated locally, but may be associated with another one of the computer systems 14a-14b. A read only memory (ROM) (not shown) typically stores the basic input output system (BIOS), which on power up, or boot, of the respective computer system, retrieves the operating system (or kernel) 18 from the nonvolatile memory storage device and loads it into the local memory 32. The foregoing computer components are well known and commercially available in the industry.

As is further shown in FIG. 2, the computer system 14 further includes a processor 38 that is driven by the operating system 18, perhaps in combination with an application program, an input device 39, for example but not limited to, a keyboard, mouse, etc., an output device 44, for example but not limited to, a display, printer, etc., a local interface 46 that interconnects the local memory 32, the processor 38, the input device 39, and the output device 44, and a network interface mechanism 47 that interfaces the local interface 46 with the network 12. The network interface mechanism 47 is essentially buffering and timing circuitry for establishing communication of signals between the local interface 46 and the network 12. The aforementioned elements in this paragraph are well known in the art.

Figure 3:
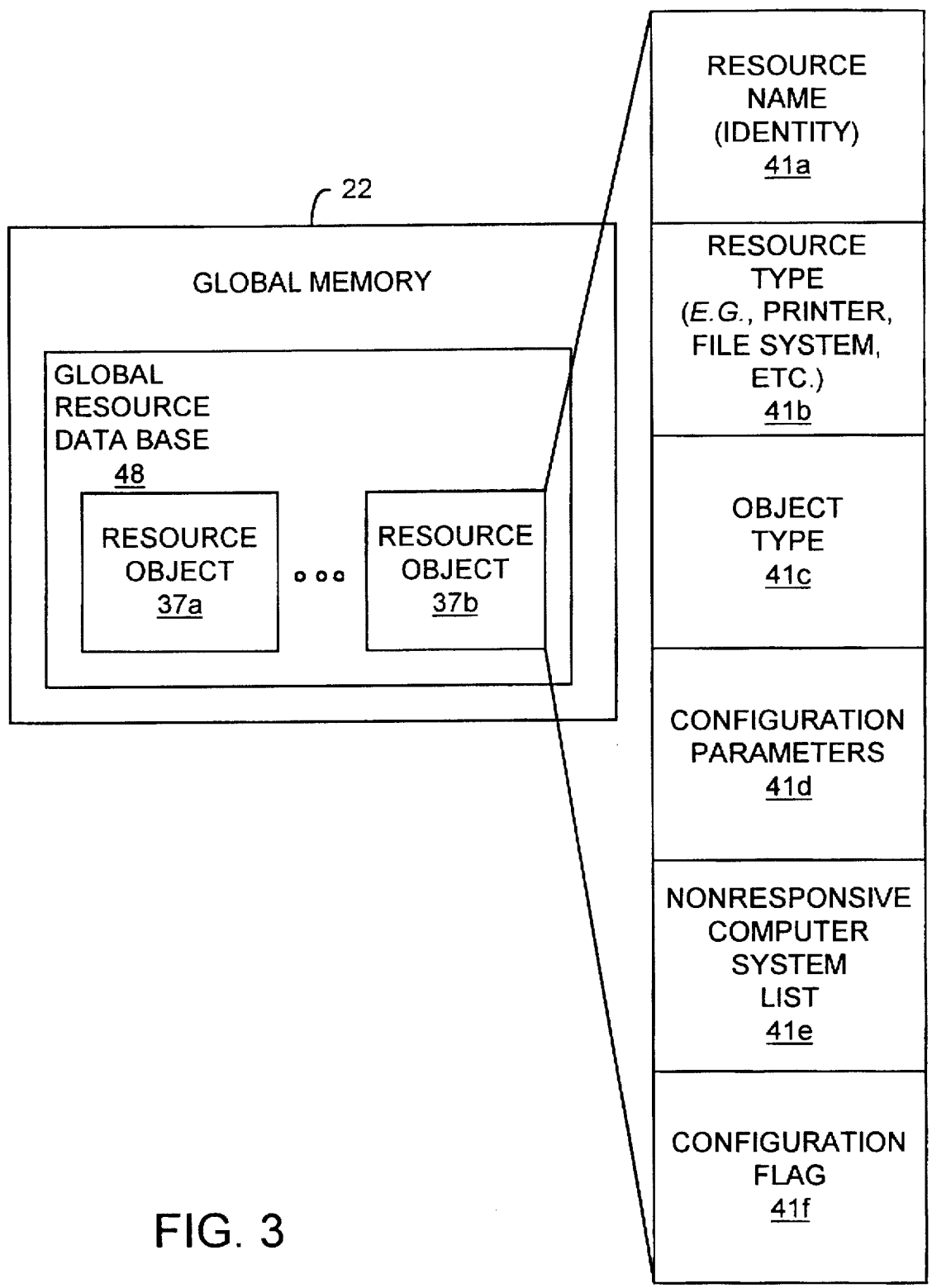
FIG. 3 is a block diagram of data structures in a global resource data base of FIG. 1.

Referring to FIG. 3, the global memory 22 includes a global resource data base 48. Generally, the global resource data base 48 maintains a plurality of resource objects 37a-37b, each pertaining to a resource that is in the domain, and provides information to the task manager 34 and the reconciliator 36 regarding the configuration state of each resource, based upon the resource objects 37. In the global resource data base 48, a resource object 37 represents each resource in the network domain. Moreover, in the preferred embodiment, each resource object 37 has at least the following attributes, which are generally data fields:

(a) a resource name 41a, or identity, to which the resource object 37 corresponds;
(b) a resource type 41b (e.g., printer, file system, etc.);
(c) an object type 41c, which is either:
  (1) configuration, which is a resource object 37 referring to a specific resource (e.g., printer, file system, etc.);
  (2) policy, or a resource object 37 applying to all resources of this type (e.g., the default printer);
(d) configuration parameters 41d, which include all of the attributes necessary to completely configure the resource; as an example, the configuration parameters for a file system may include source, destination, designation of read/write or read only, designation regarding super user access or not, etc.;
(e) a nonresponsive computer system list 41e, which includes the computer systems 14a-14c that were nonresponsive or disqualified during the last time when a configuration task was executed for this resource; each entry in this list comprises:
  (1) a computer system name; and
  (2) an action, such as add, modify, or delete; and
(f) a configuration flag 41f, which indicates whether the resource is currently configured or unconfigured.

In the context of this document, a configuration state is the state of a specific resource (e.g., printer, file system, etc.) and includes (c) configuration parameters 41d and (e) the configuration flag 41f. Furthermore, a "configuration task" is a set of one or more instructions to add, delete, or modify a resource object 37, as defined above.

Figure 4:
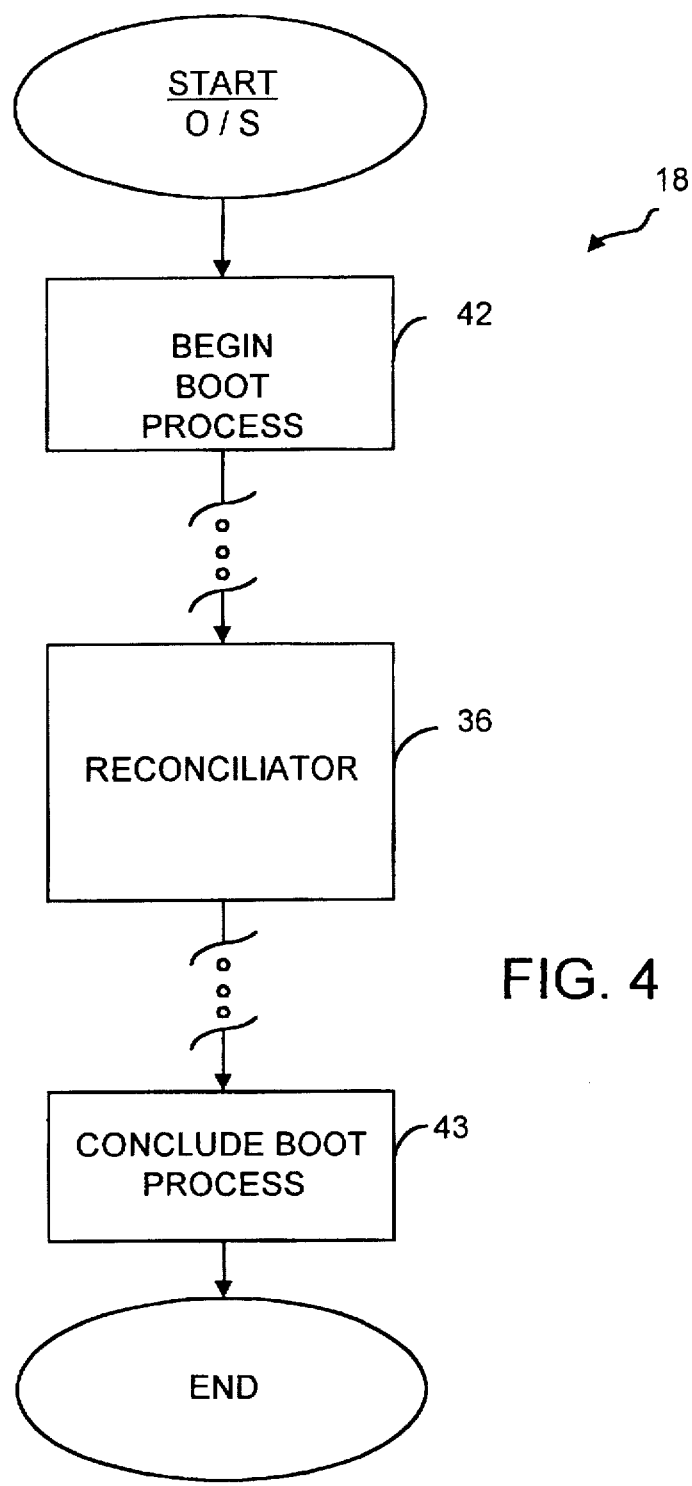
FIG. 4 is a flow chart illustrating select modules of an operating system (O/S) of the computer system of FIG. 2, the modules being relevant to the reconciliator of the global resource management system of FIGS. 1 and 2.

A high level block diagram that shows the relevant software modules of the operating system 18 (FIG. 2) relative to the global resource management system 30, and particularly, the reconciliator 36, is set forth in FIG. 4. The flow chart of FIG. 4 as well as the flow charts to be described hereafter, set forth the architecture and functionality of the software modules, or instruction blocks, associated with and/or called upon by the respective program. With reference to a block 42 of FIG. 4, initially, the operating system 18 commences a boot process (or an initialization process), when the respective computer system 14 is activated or just begins participation in the network domain. After the boot process has been commenced and during the configuration process (a subprocess within the boot process), the software module pertaining to the reconciliator 36 (FIG. 2) is called upon and executed, as is indicated in the block 36 in FIG. 4. The reconciliator 36 ensures that the current global configuration state of its corresponding computer system 14 is up-to-date and accurate. The architecture and modules of the reconciliator 36 will be described in detail hereafter with reference to FIG. 6. Next, the operating system 18 completes the boot process and makes itself available to the one or more application programs and/or the user of the computer system 14, as indicated in the block 43.

Figure 5:
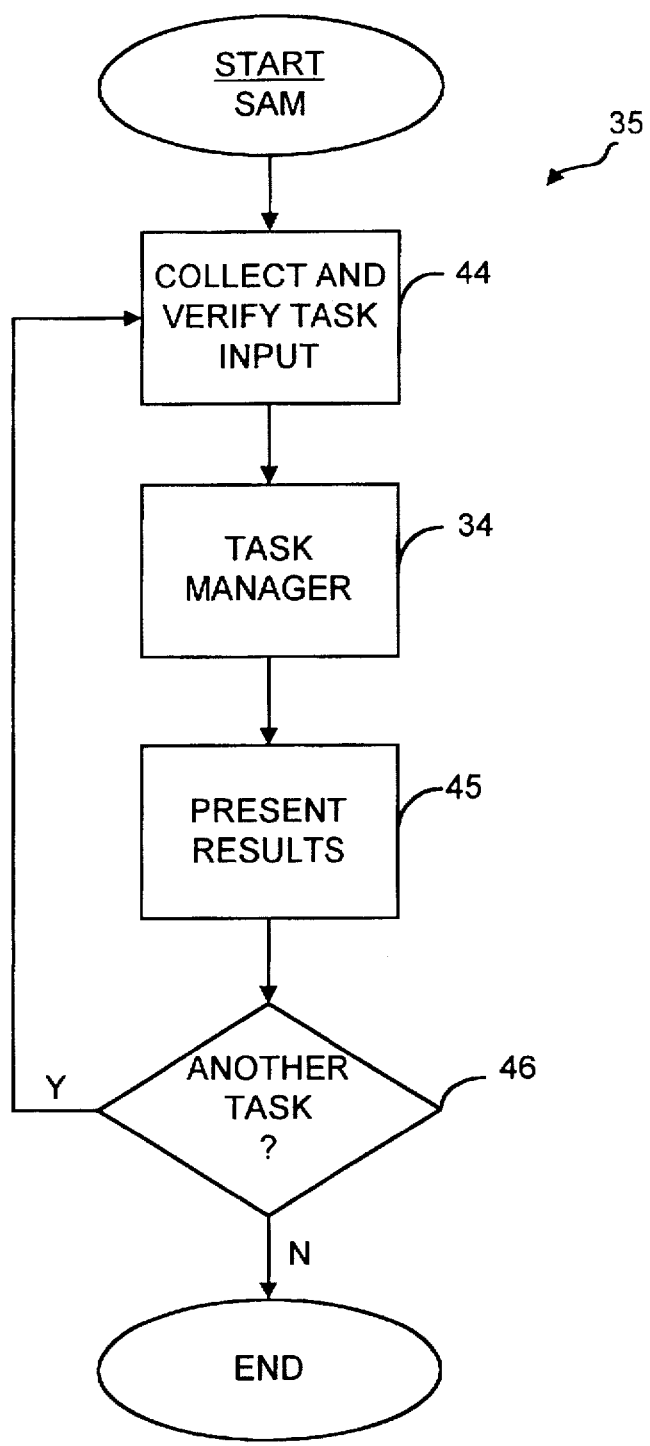
FIG. 5 is a flow chart illustrating select modules of a system administration manager (SAM) of the computer system of FIG. 2 that operates as an application program over the operating system, the modules being relevant to the task manager of the global resource management system of FIGS. 1 and 2.

FIG. 5 shows select modules of the SAM 35 that are relevant to initiation of the task manager 34. The operating system 18 will continue to drive the processor 38 under the command of application programs and/or the user until the computer system 14 receives one or more configuration tasks via the SAM 35, which ultimately comes from the user. Recall that a configuration task is defined as a command or script to add, modify, or delete a resource object 37, and resource objects 37 are stored in the global resource data base 48 (FIG. 1) in the global memory 22 (FIG. 1).

The SAM 35 can process one or more configuration tasks. When a plurality of configuration tasks are received, the SAM 18 processes them in succession via a loop commencing with block 44 in FIG. 5. At block 44, SAM 35 collects and verifies one of the task inputs. Then, as indicated by block 34 in FIG. 5, the SAM 35 calls and executes a software module pertaining to the task manager 34 (FIG. 2). In general, the task manager 34 forwards commands to the other computer systems 14 of the network system 11 to perform the configuration task on the computer systems 14a–14c of the network domain. The architecture and modules of the task manager 34 will be described in detail hereafter relative to FIG. 6.

After the task manager has concluded its operation on the particular configuration task, control of the computer system 14 is passed back to the SAM 18, which presents the results of the configuration task, via perhaps the output device 44 (e.g., a display; see FIG. 2), to the user. The foregoing is shown in block 45. The configuration results could indicate a successful accomplishment of the task or a problem or inability to perform the task. Finally, as indicated at block 46, the SAM 35 makes a determination as to whether any configuration tasks remain to be executed. If so, then block 46 transfers to block 44, the next configuration task is retrieved, and the aforementioned process is performed once again on the new configuration task. In not, then operation of the SAM 35 relative to the task manager 34 terminates.

Figure 6:
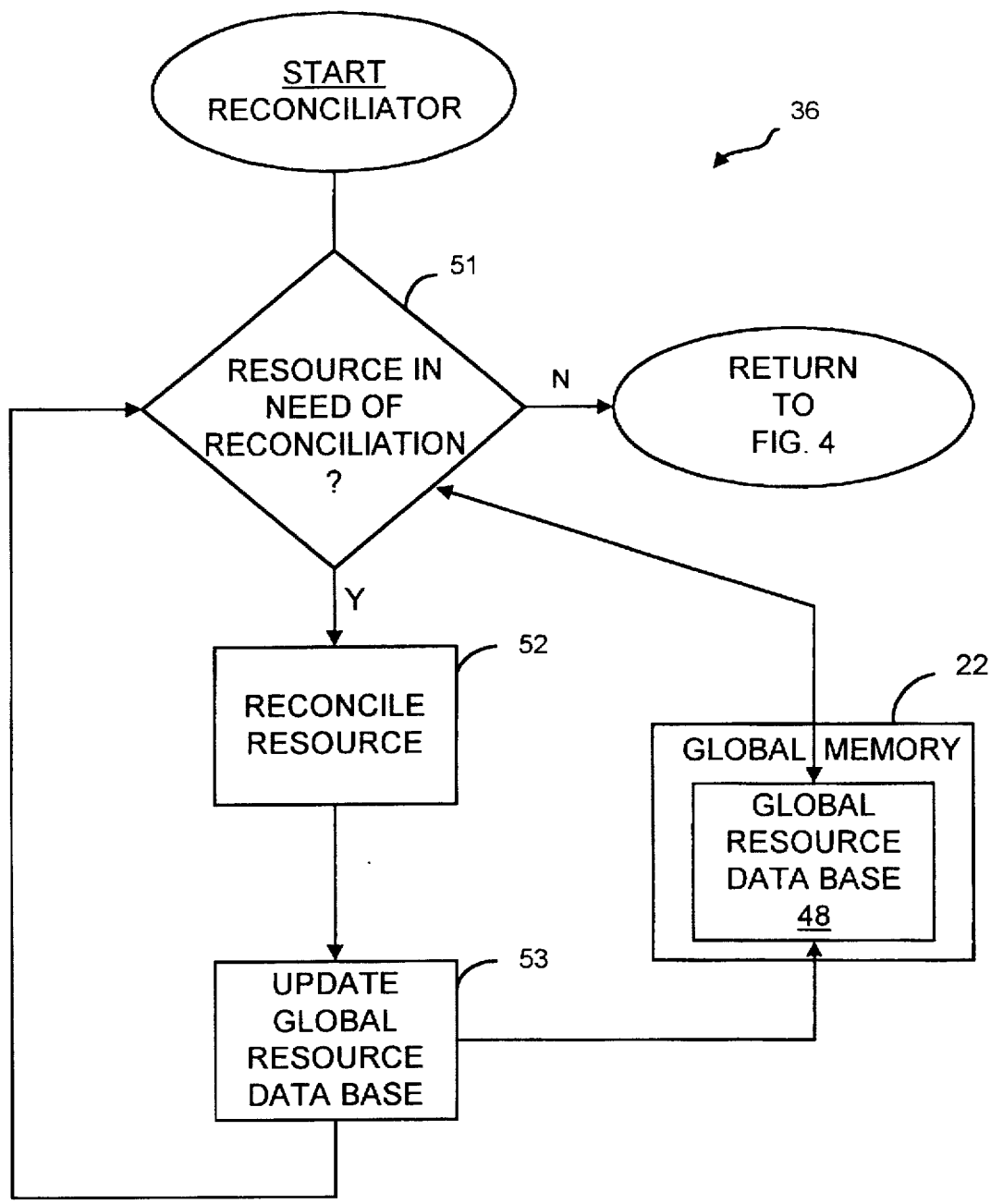
FIG. 6 is a flow chart illustrating the architecture and modules of the reconciliator of FIGS. 2 and 3.

The architecture and functionality of the reconciliator 36 (FIG. 2) will now be described in detail with reference to FIG. 6. When the software module(s) pertaining to the reconciliator 36 is initiated, the global resource data base 48 situated within the global memory 22 is consulted by the reconciliator 36 to accommodate any unperformed configuration tasks that were directed to the respective computer system 14, while the respective computer system 14 was unavailable to the network domain, due to perhaps deactivation or some other reason.

In this regard, the reconciliator 36 views resource objects 37 in the global resource data base 48 corresponding to the resources. Particularly, the reconciliator 36 consults the nonresponsive computer system list 41e (FIG. 3) associated with the resource object 37 of each resource. The nonresponsive computer system list 41e of each resource object 37 is a listing of names, or identities, of computer systems 14 that were nonresponsive when a task manager 34 of the network attempted to initiate a configuration task thereon relative to the resource. The nonresponsive computer system list 41e permits a computer system 14 that was unavailable at the time when a configuration task was executed to have its local view of a resource brought into line with the global view when the computer system 14 rejoins the domain. Associated with an identity of each nonresponsive computer system 14 on the nonresponsive computer system list 41e is a configuration action (i.e., add, modify, or delete a resource) that should be performed to reconcile the views. Each resource type (e.g., printer, file system, etc.) has one or more particular configuration tasks associated with each action. The reconciliator 36 will execute the configuration tasks, based upon the specified action, on its respective computer system 14 by modifying the configuration states corresponding with those resources that are at issue in the configuration action.

The structure of the software for the reconciliator 36 is as follows, with reference to FIG. 6. First, at block 51, the reconciliator 36 determines a resource object 37 corresponding with a resource that requires reconciliation by the respective computer system 14 from the global resource data base 48. More specifically, the reconciliator 36 examines the nonresponsive computer system list 41e of each resource object 37 to determine if the identity of the respective computer system 14 (associated with the reconciliator 36) is listed. If so, then the resource object 37 is retrieved. If not, then the resource object 37 is passed upon and another is examined.

If a resource object 37 in need of reconciliation has been identified and retrieved, then block 51 transfers to block 52. The resource object 37 is reconciled by the code of block 52. The code performs one or more configuration tasks on the resource at issue, based upon the configuration action specified in the nonresponsive computer system list 41e. To the contrary, if at block 51 an unreconciled resource object 37 is not identified and retrieved, then block 51 transfers back to the operating system 18 (FIG. 4).

Next, after the performance of the task(s), block 52 transfers to block 53. At block 53, the reconciliator 36 updates the global resource data base 48. Specifically, the reconciliator 36 removes the identity of the computer system 14 from the nonresponsive computer system list 41e of the resource object 37 at issue and modifies the configuration state of the resource object 37.

Block 53 transfers back to block 51, where the reconciliator 36 again consults the global resource data base 48 for retrieving another resource object 37 corresponding to a resource that is in need of reconciliation. If none remain, then the reconciliator will return to the operating system 14, as shown in FIG. 6. If any remain, then blocks 52, 53 are executed upon the new resource and the process continues.

Figure 7:
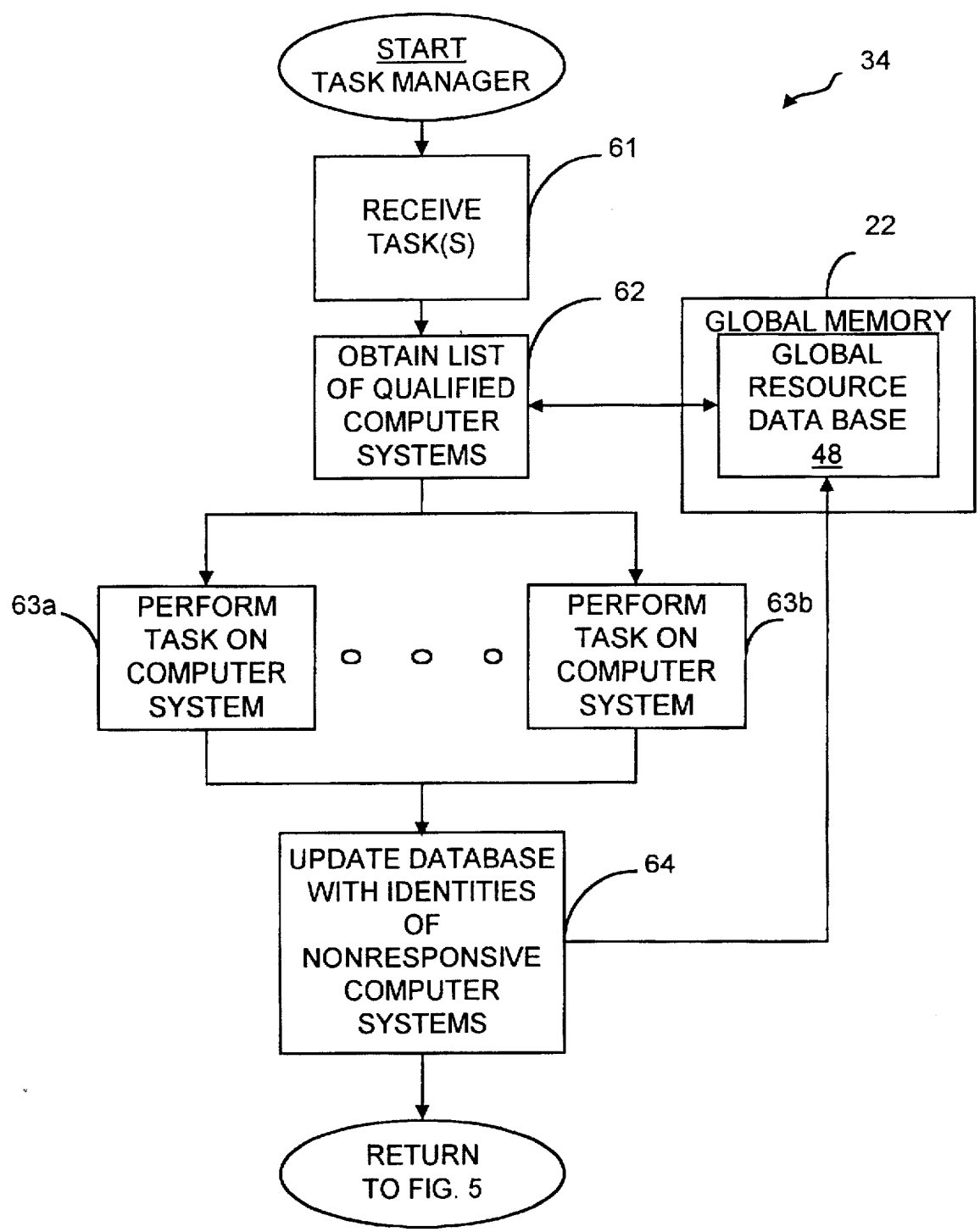
FIG. 7 is a flow chart illustrating the architecture and modules of the task manager of FIGS. 2 and 4.

The architecture and functionality of the task manager 34 (FIG. 2) is set forth in FIG. 7 by way of a flow chart. The sequence of events indicated in FIG. 7 occurs after the user has indicated to the SAM 35 that one or more global resource configuration changes are to occur and after the configuration tasks are collected and verified. Initially, the task manager 34 receives the one or more configuration tasks from SAM 35, as indicated in the block 61. Specifically, the task manager 34 receives a configuration task including at least the following data:

(a) an action to add, modify, or delete a specific resource;

(b) an identity, or name, of the specific resource (e.g., the printer 24, a file system, etc.) that the action involves and any appropriate configuration data in support of the action; and (c) identities, or names, of the computer systems 14a–14c where the configuration task is to be performed.

After receiving the aforementioned data, the task manager 34 obtains the names 41a (FIG. 3) of qualified computer systems 14 that reside in the network domain. The qualification requirement is essentially a filtering mechanism that filters out those computer systems 14 that were nonresponsive during the last time when a task was to be performed. "Qualified" computer systems 14 are those that are not listed on the nonresponsive computer system list 41e (FIG. 3) associated with the specific resource presently at issue (identified by data (b) above). "Unqualified" computer systems 14a–14c are those named in the nonresponsive computer system list 41e.

Next, as indicated in the blocks 63a, 63b, the task manager 34 sends configuration tasks, based upon the configuration task, to the qualified computer systems 14 for execution thereon. Preferably, the configuration tasks are forwarded by the task manager 34 to the remote computer systems 14 in a concurrent manner so that the remote computer systems 14 can execute the tasks concurrently. If a remote computer system 14 is responsive, then the remote computer system will execute the configuration task and its configuration will be proper and current. However, if a computer system 14 is nonresponsive to the task, then the task manager 34 will have this information recorded in the nonresponsive computer system list 41e associated with the particular resource involved in the task. This permits any such nonresponsive computer system 14 to perform the task at a later time when the nonresponsive computer system 14 executes the software module pertaining to its corresponding reconciliator 36 (FIG. 2).

Finally, after execution of block 64, the task manager 34 terminates operation and returns to the module pertaining to the block 34 in FIG. 5. The SAM 35 directly, and thus the task manager 34 indirectly, may be called upon by the user virtually any time during operation of the respective computer system 14.

Operation

The operation of the global resource management system 30 of the present invention can be broadly summarized as follows. Initially, the application SAM 35 (FIG. 2) is initiated in a particular computer system 14 (one of 14a–14c; see FIG. 1) by the user, and a configuration task is communicated by the user to the SAM 35 via an input device 39 (FIG. 2). The task manager 34 of the particular computer system 14 determines which of the other computer systems 14 are part of the network domain and which of the domain computer systems 14 are qualified in view of the task by consulting the global resource data base 48. With respect to qualification, any computer system 14 is qualified if the resource at issue in the task does not have the computer system 14 listed in the resource's nonresponsive computer system list 41e.

The task manager 34 on the particular computer system 14 forwards a series of configuration tasks to the qualified computer systems 14. The responsive computer systems 14a–14c execute their corresponding configuration task. Moreover, the particular computer system running the task manager 34 stores the identity of any nonresponsive computer system 14 along with a configuration action in the global resource data base 48 of the global memory 22 associated with the server computer system 14a.

When any such nonresponsive computer system 14 becomes responsive, i.e., is activated or desires to become part of the network domain, the reconciliator 36 (FIG. 2) associated with the nonresponsive computer system 14 (now responsive) consults the global resource data base 48 (FIG. 5) of the global memory 22 associated with the server computer system 14a to accommodate any unperformed configuration tasks that were directed to the respective computer system 14.

In this regard, the reconciliator 36 views configuration data in the global resource data base 48 corresponding to the global resources. Particularly, the reconciliator 36 consults the nonresponsive computer system list 41e (FIG. 3) associated with each resource object 37 corresponding with each resource. The nonresponsive computer system list 41e of each resource object 37 lists names of computer systems 14 that were nonresponsive when a task manager 34 of the network domain attempted to initiate a configuration task thereon relative to the resource and lists a configuration action with each identity. The reconciliator 36 executes any delineated configuration actions.

In concluding the detailed description, it should be noted that it will be obvious to those skilled in the art that many variations and modifications may be made to the preferred embodiment of the global resource management system and method without substantially departing from the principles thereof. All such variations and modifications are intended to be included herein within the scope of the present invention, as set forth in the following claims. Furthermore, in the claims hereafter, the structures, materials, acts, and equivalents of all means or step-plus-function elements are intended to include any structure, material, or act for performing the functions, in combination with other elements as specifically claimed.

Wherefore, the following is claimed:

1. A system for a computer system for enabling automatic configuration of global resources, the computer system being interconnected with at least one other computer system via a network, the computer systems capable of communicating with a global memory, the system comprising:

a task manager configured to receive and execute a configuration task involving a resource connected to said network, said task manager configured to forward said configuration task to at least one other computer system for execution thereon, said task manager configured to store an identity of any nonresponsive computer system along with a configuration action in said global memory; and a reconciliator configured to communicate with said global memory when said computer system is activated to retrieve any configuration action that is directed to said computer system, said reconciliator configured to perform any said configuration action upon said computer system.

2. The system of claim 1, wherein said configuration task includes a command to perform one of the set comprising adding, modifying, and deleting a resource object.

3. The system of claim 1, wherein said task manager and said reconciliator are separate software modules and both are applications that reside logically over a computer operating system associated with said computer system.

4. The system of claim 1, wherein said task manager is configured to substantially concurrently forward said configuration task to said other computer systems.

5. The system of claim 1, wherein said task manager further comprises a means for determining whether said at least one other computer system is unqualified and for refraining from forwarding said configuration task to any unqualified computer system, said at least one other computer system being unqualified when said at least one other computer system was nonresponsive to a previous configuration task directed thereto.

6. The system of claim 1, (a) wherein said global memory further comprises a resource object for each resource that is connected to said network, each said resource object comprising:

(1) a configuration flag indicating whether said resource object is configured and unconfigured; and (2) a nonresponsive computer system list indicating an identity of any nonresponsive computer system that was nonresponsive to a previous task and indicating a configuration action with said identity;

and (b) wherein said task manager further comprises:

(1) a means for examining said configuration flag associated with each of said resource objects to determine if each of said resource objects is configured and unconfigured;

(2) a means for forwarding said configuration task to any other computer system that is connected to a resource corresponding to said configured resource object for execution of said configuration task on said any other computer system; and (3) a means, when said resource object is unconfigured, for refraining from forwarding said configuration task to any other computer system that is connected to a resource corresponding to said unconfigured resource object.

7. The system of claim 1, (a) wherein said global memory further comprises a resource object for each resource that is connected to said network, each said resource object comprising a nonresponsive computer system list indicating an identity of any nonresponsive computer system that was nonresponsive to a previous task directed thereto and indicating a configuration action with said identity; and (b) wherein said reconciliator further comprises (1) a means for examining said nonresponsive computer system list to determine if said computer system is listed therein; and (2) a means, when said computer system is listed in said nonresponsive computer system list, for executing said configuration action from said list.

8. The system of claim 1, wherein said global memory is a nonvolatile memory storage device.

9. A computer readable medium having a computer program for a particular computer system that is to be operated within a network having a plurality of computer systems and a global resource data base stored in a global memory connected to the network, the computer program comprising:

a task manager configured to receive and execute a configuration task, said task manager configured to forward said configuration task to another computer system for execution thereon and to store an identity of any nonresponsive computer system along with a configuration action in said global resource data base in said global memory; and a reconciliator configured to communicate with said global resource data base in said global memory when said particular computer system is activated to retrieve any said configuration action directed to said particular computer system, said reconciliator configured to perform any said configuration action upon said particular computer system.

10. The computer readable medium of claim 9, further comprising:

a processor;

an input device configured to receive said configuration task to be performed on computer systems in said network; and a local interface for interconnecting said processor, said computer readable medium, and said input device.

11. The computer readable medium of claim 10, wherein said medium is a portable diskette.

12. A system comprising a plurality of computer systems interconnected via a network and a global resource data base stored in a global memory connected to said network, each said computer system comprising:

a processor;

a local memory;

an input device configured to receive a configuration task to be performed on computer systems in said network;

a local interface for interconnecting said processor, said local memory, and said input device;

a task manager stored in said local memory and driven by said processor, said task manager adapted to receive and execute a configuration task, said task manager configured to forward said configuration task to at least one other computer system for execution thereon and to store an identity of any nonresponsive computer system along with a configuration action that corresponds to said configuration task in said global resource data base in said global memory; and a reconciliator stored in said local memory and driven by said processor, said reconciliator configured to communicate with said global resource data base in said global memory when said each computer system is activated to retrieve any said configuration action directed to said each computer system, said reconciliator configured to perform any said configuration action upon said each computer system.

13. The system of claim 12, wherein said configuration task includes a command to perform one of the set comprising adding, modifying, and deleting a resource object.

14. The system of claim 12, wherein said task manager and said reconciliator are separate software modules and both are applications that reside logically over a computer operating system associated with said computer system.

15. The system of claim 12, wherein said task manager is configured to substantially concurrently forward said configuration task to said other computer systems.

16. The system of claim 12, wherein said task manager further comprises a means for determining whether said at least one other computer system is unqualified and for refraining from forwarding said configuration task to any unqualified computer system, said at least one other computer system being unqualified when said at least one other computer system was nonresponsive to a previous configuration task directed thereto.

17. The system of claim 12, (a) wherein said global resource data base further comprises a resource object for each resource that is connected to said network, each said resource object comprising:

(1) a configuration flag indicating whether said resource object is configured and unconfigured; and (2) a nonresponsive computer system list indicating an identity of any nonresponsive computer system that was nonresponsive to a previous task and indicating a configuration action with said identity;

and (b) wherein said task manager further comprises:

(1) a means for examining said configuration flag associated with each of said resource objects to determine if said resource object is configured and unconfigured;

(2) a means for forwarding said configuration task to any other computer system that is connected to a resource corresponding to said configured resource object for execution of said configuration task on said any other computer system; and (3) a means, when said resource object is unconfigured, for refraining from forwarding said configuration task to any other computer system that is connected to a resource corresponding to said unconfigured resource object.

18. The system of claim 12, (a) wherein said global resource data base further comprises a resource object for each resource that is connected to said network, each said resource object comprising a nonresponsive computer system list indicating an identity of any nonresponsive computer system that was nonresponsive to a previous task directed thereto and indicating a configuration action with said identity;

and (b) wherein said reconciliator further comprises (1) a means for examining said nonresponsive computer system list to determine if said computer system is listed therein; and (2) a means, when said computer system is listed in said nonresponsive computer system list, for executing said configuration action from said list.

19. The system of claim 12, wherein said global memory is a nonvolatile memory storage device.

20. A method for configuring a plurality of interconnected computer systems that have access to a global memory, the method comprising the steps of:

communicating a configuration task to a particular computer system;

executing said configuration task on said particular computer system;

forwarding said configuration task from said particular computer system to at least one other computer system for execution thereon;

storing an identity of a nonresponsive computer system along with a configuration action that corresponds with said configuration task in said global memory; and when said nonresponsive computer system becomes responsive, executing a configuration task that corresponds to said configuration action on said nonresponsive computer system.

* * * * *